(12) United States Patent
Dubreuil et al.

(10) Patent No.: US 8,586,808 B2
(45) Date of Patent: Nov. 19, 2013

(54) SELECTIVE HYDROGENATION CATALYST, AND PROCESS FOR ITS PREPARATION

(75) Inventors: Anne Claire Dubreuil, Lyons (FR); Lars Fischer, Vienne (FR); Bernadette Rebours, Lyons (FR); Renaud Revel, Serpaize (FR); Cecile Thomazeau, Lyons (FR)

(73) Assignee: IFP Energies Nouvelles, Rueil-Malmaison Cedex (FR)

( * ) Notice: Subject to any disclaimer, the term of this patent is extended or adjusted under 35 U.S.C. 154(b) by 449 days.

(21) Appl. No.: 12/866,503

(22) PCT Filed: Jan. 30, 2009

(86) PCT No.: PCT/FR2009/000103
§ 371 (c)(1),
(2), (4) Date: Aug. 6, 2010

(87) PCT Pub. No.: WO2009/109722
PCT Pub. Date: Sep. 11, 2009

(65) Prior Publication Data
US 2010/0324346 A1    Dec. 23, 2010

(30) Foreign Application Priority Data
Feb. 7, 2008 (FR) .................. 08 00724

(51) Int. Cl.
*C07C 5/03* (2006.01)
*C01F 7/02* (2006.01)
*C10G 45/00* (2006.01)
*B01J 23/00* (2006.01)
*B01J 21/00* (2006.01)

(52) U.S. Cl.
USPC ........... 585/276; 208/144; 423/625; 502/335; 502/355; 502/415; 502/439

(58) Field of Classification Search
USPC ............ 502/335, 355, 415, 439; 423/625; 585/276; 208/144
See application file for complete search history.

(56) References Cited

U.S. PATENT DOCUMENTS

| | | | | |
|---|---|---|---|---|
| 3,031,418 A * | 4/1962 | Bugosh | | 516/94 |
| 3,268,295 A * | 8/1966 | Armbrust, Jr. et al. | | 423/625 |
| 3,879,310 A * | 4/1975 | Rigge et al. | | 502/208 |
| 4,012,337 A * | 3/1977 | Mitchell, III | | 502/223 |
| 4,179,408 A * | 12/1979 | Sanchez et al. | | 502/8 |
| 4,292,295 A * | 9/1981 | Pajot et al. | | 423/625 |
| 4,301,037 A * | 11/1981 | Sanchez et al. | | 502/303 |
| 4,371,513 A * | 2/1983 | Sanchez et al. | | 423/625 |
| 4,390,456 A * | 6/1983 | Sanchez et al. | | 502/8 |
| 5,389,589 A * | 2/1995 | Kharas | | 501/127 |
| 5,569,802 A | 10/1996 | Luken et al. | | |
| 5,877,106 A * | 3/1999 | Kharas et al. | | 501/127 |
| 5,972,820 A * | 10/1999 | Kharas et al. | | 501/127 |
| 6,043,187 A | 3/2000 | Harle et al. | | |
| 6,162,350 A * | 12/2000 | Soled et al. | | 208/113 |
| 6,437,206 B1 | 8/2002 | Meyer et al. | | |
| 6,627,571 B1 * | 9/2003 | Lugmair et al. | | 502/2 |
| 6,821,923 B1 * | 11/2004 | Kuperman et al. | | 502/344 |
| 7,090,824 B2 * | 8/2006 | Pinnavaia et al. | | 423/625 |
| 7,534,415 B2 * | 5/2009 | Pinnavaia et al. | | 423/625 |
| 7,538,065 B2 * | 5/2009 | McCarthy et al. | | 502/258 |
| 2005/0019249 A1 | 1/2005 | Noweck et al. | | |
| 2006/0096891 A1 | 5/2006 | Stamires et al. | | |
| 2009/0030250 A1 | 1/2009 | Hill et al. | | |

FOREIGN PATENT DOCUMENTS

| | | | |
|---|---|---|---|
| EP | 0 576 828 A1 | 1/1994 | |
| FR | 2 764 213 A1 | 12/1998 | |
| WO | WO 2006/040159 A1 | 4/2006 | |
| WO | WO 2006/125832 A1 | 11/2006 | |

OTHER PUBLICATIONS

International Search Report of PCT/FR2009/000103 (Sep. 18, 2009).

* cited by examiner

*Primary Examiner* — Cam N. Nguyen
(74) *Attorney, Agent, or Firm* — Millen, White, Zelano & Branigan, P.C.

(57) ABSTRACT

The invention concerns a catalyst comprising nickel on an aluminum oxide support. The aluminum oxide support has, in the calcined state, a diffractogram obtained by X ray diffractometry comprising peaks which correspond to the following interplanar spacings and relative intensities:

| Interplanar spacings $d\ (10^{-10}\ m)$ | Relative intensities $I/I_0\ (\%)$ |
|---|---|
| 5.03 to 5.22 | 1-5 |
| 4.56 to 4.60 | 1-10 |
| 4.06 to 4.10 | 1-5 |
| 2.80 to 2.85 | 5-20 |
| 2.73 | 15-35 |
| 2.60 | 5-10 |
| 2.43 | 35-40 |
| 2.29 | 30-40 |
| 1.99 | 60-95 |
| 1.95 | 25-50 |
| 1.79 | 1-10 |
| 1.53 | 5-10 |
| 1.51 | 5-10 |
| 1.41 | 40-60 |
| 1.39 | 100 |
| 1.23 to 1.26 | 1-5 |
| 1.14 | 5-10 |
| 1.11 | 1-5 |
| 1.04 | 1-5 |
| 1.00 | 5-10 |
| 0.97 | 1-5. |

23 Claims, No Drawings

SELECTIVE HYDROGENATION CATALYST, AND PROCESS FOR ITS PREPARATION

The selective hydrogenation process can transform polyunsaturated compounds from oil cuts by converting the most unsaturated compounds into the corresponding alkenes, thereby avoiding total saturation and thus the formation of the corresponding alkanes.

The aim of the invention is to propose a catalyst with improved performance applied to the process for selective hydrogenation of unsaturated hydrocarbon compounds present in hydrocarbon cuts, preferably cuts from steam cracking or catalytic cracking.

Hereinbelow, the groups for the chemical elements are given in accordance with the CAS classification (CRC Handbook of Chemistry and Physics, publisher: CRC Press, Editor in chief D R Lide, $81^{st}$ edition, 2000-2001). As an example, group VIII in the CAS classification corresponds to metals from columns 8, 9 and 10 of the new IUPAC classification.

PRIOR ART

Selective hydrogenation catalysts are generally based on metals from group VIII of the periodic table, preferably palladium or nickel. The metal is in the form of small metallic particles deposited on a support which may be a refractory oxide in the form of beads, extrudates, trilobes or in forms with other geometries. The metal content, the optional presence of a second metallic element, the metal particle size and the distribution of the active phase in the support are some of the criteria which have a bearing on the activity and selectivity of the catalysts.

The present invention is aimed at obtaining catalysts based on nickel having improved physico-chemical and catalytic performances compared with prior art catalysts based on nickel.

The catalysts of the invention comprise nickel deposited on an alumina support, said alumina support having a particular crystallographic structure and thus a particular diffractogram obtained by X ray diffractometry. This particular property of the support is at the origin of the improvement in the catalytic performance.

Prior art patents and patent applications disclose selective hydrogenation catalysts comprising at least one noble metal and a support based on alumina, or aluminium oxide type catalyst supports, which have particular X ray diffractograms. Particular examples which may be cited are patent applications EP-A-0 576 828 and WO-A-2006/125832 as well as U.S. Pat. No. 6,437,206B. However, those diffractograms obtained for the prior art supports or catalysts differ from those of the present invention in the presence and/or absence and/or intensity of the peaks obtained for given interplanar spacings.

SUMMARY OF THE INVENTION

The invention concerns a catalyst comprising nickel on an aluminium oxide support. The aluminium oxide support has, in the calcined state, a diffractogram obtained by X ray diffractometry (XRD) comprising peaks which correspond to the following interplanar spacings and relative intensities:

| Interplanar spacings d ($10^{-10}$ m) | Relative intensities $I/I_0$ (%) |
|---|---|
| 5.03 to 5.22 | 1-5 |
| 4.56 to 4.60 | 1-10 |
| 4.06 to 4.10 | 1-5 |
| 2.80 to 2.85 | 5-20 |
| 2.73 | 15-35 |
| 2.60 | 5-10 |
| 2.43 | 35-40 |
| 2.29 | 30-40 |
| 1.99 | 60-95 |
| 1.95 | 25-50 |
| 1.79 | 1-10 |
| 1.53 | 5-10 |
| 1.51 | 5-10 |
| 1.41 | 40-60 |
| 1.39 | 100 |
| 1.23 to 1.26 | 1-5 |
| 1.14 | 5-10 |
| 1.11 | 1-5 |
| 1.04 | 1-5 |
| 1.00 | 5-10 |
| 0.97 | 1-5 |

DETAILED DESCRIPTION OF THE INVENTION

The present invention envisages the production of nickel-based catalysts having improved physico-chemical properties and catalytic performances compared with prior art nickel-based catalysts. More precisely, the present invention proposes a process for preparing an alumina support as well as the preparation of a catalyst on said alumina support, and a selective hydrogenation process employing said catalyst, resulting in improved catalytic performances for said catalyst.

The present invention concerns catalysts comprising nickel on an alumina support. The alumina support has, in the calcined state, a diffractogram obtained by X ray diffractometry comprising peaks which correspond to the following interplanar spacings and relative intensities:

| Interplanar spacings d ($10^{-10}$ m) | Relative intensities $I/I_0$ (%) |
|---|---|
| 5.03 to 5.22 | 1-5 |
| 4.56 to 4.60 | 1-10 |
| 4.06 to 4.10 | 1-5 |
| 2.80 to 2.85 | 5-20 |
| 2.73 | 15-35 |
| 2.60 | 5-10 |
| 2.43 | 35-40 |
| 2.29 | 30-40 |
| 1.99 | 60-95 |
| 1.95 | 25-50 |
| 1.79 | 1-10 |
| 1.53 | 5-10 |
| 1.51 | 5-10 |
| 1.41 | 40-60 |
| 1.39 | 100 |
| 1.23 to 1.26 | 1-5 |
| 1.14 | 5-10 |
| 1.11 | 1-5 |
| 1.04 | 1-5 |
| 1.00 | 5-10 |
| 0.97 | 1-5 |

Only peaks with a relative intensity of 1% or more are considered.

Throughout the text, the interplanar spacings are given with an accuracy of $\pm 0.01 \times 10^{-10}$ m.

In a preferred mode, the alumina support has, in its calcined state, a diffractogram comprising only the peaks corresponding to the following interplanar spacings and relative intensities:

| Interplanar spacings<br>d $(10^{-10}$ m) | Relative intensities<br>$I/I_0$ (%) |
|---|---|
| 5.41 to 5.47 | 0-5 |
| 5.03 to 5.22 | 1-5 |
| 4.56 to 4.60 | 1-10 |
| 4.06 to 4.10 | 1-5 |
| 2.86 to 2.88 | 5-20 |
| 2.80 to 2.85 | 5-20 |
| 2.73 | 15-35 |
| 2.60 | 5-10 |
| 2.43 | 35-40 |
| 2.29 | 30-40 |
| 1.99 | 60-95 |
| 1.95 | 25-50 |
| 1.92 | 0-20 |
| 1.79 | 1-10 |
| 1.53 | 5-10 |
| 1.51 | 5-10 |
| 1.45 | 0-10 |
| 1.43 | 0-10 |
| 1.41 | 40-60 |
| 1.39 | 100 |
| 1.23 to 1.26 | 1-5 |
| 1.14 | 5-10 |
| 1.11 | 1-5 |
| 1.04 | 1-5 |
| 1.00 | 5-10 |
| 0.97 | 1-5 |

The diffractogram is characteristic of the specific structure of the catalyst support of the invention. The alumina support may include impurities and additives as long as the diffractogram remains as described above. As an example, the support may comprise inorganic oxides such as oxides of metals from groups IIA, IIIB, IVB, IIB, IIIA, or IVA of the CAS classification, preferably silica, titanium dioxide, zirconium dioxide, zinc oxide, magnesium oxide or calcium oxide.

The quantity of column IIA, IIB, IVB, IIB, IIA, IVA cations is preferably in the range 0.01% to 30% by weight, more preferably in the range 0.01% to 10% by weight, and highly preferably in the range 0.03% to 1.5% by weight. If it is present in the catalyst, the quantity of metal from group IB may be in the range 1 to 10000 ppm by weight with respect to the support.

The maximum quantity of oxides other than alumina in the support depends on the oxides present. It may be determined by the diffractogram, since a change in diffractogram is associated with a change in structure. In general, the amount of such oxides is less than 50%, preferably 30%, more preferably 15% by weight with respect to the mass of the support.

In accordance with the invention, the porous support is advantageously in the form of beads, trilobes, extrudates, pellets, or irregular and non-spherical agglomerates the specific form of which may be the result of a crushing step. Highly advantageously, said support is in the form of beads or extrudates. More advantageously, said support is in the form of beads.

The pore volume of the support is generally in the range 0.1 to 1.5 cm$^3$/g, preferably in the range 0.5 to 1 cm$^3$/g.

The specific surface area of the porous support is in the range 30 to 130 m$^2$/g, preferably in the range 50 to 100 m$^2$/g, and more preferably in the range 60 to 80 m$^2$/g.

The amount of nickel in the catalyst is generally in the range 1% to 50% by weight, preferably in the range 5% to 30% by weight.

Thus, in addition to the characteristic peaks of the support, the diffractogram of the catalyst in the oxide form has the characteristic peaks of nickel, in the oxide form or in the form in which it is present in combination with other compounds (nickel nitrate, nickel chlorate, nickel formate). The skilled person will refer to ICDD (International Centre for Diffraction Data) tables to find the positions of these peaks for each of the compounds described above. As an example, the positions of the peaks for nickel oxide, NiO, are reported in tables 00-047-1049 or 01-071-1179. They are as follows, reported as d $(10^{-10}$ m): 2.41, 2.09, 1.48, 1.25, 1.21, 1.04, 0.96, 0.93, 0.85, and 0.80. The positions for the peaks for nickel nitrate compounds Ni(NO$_3$)$_2$(OH)$_y$.xH$_2$O (x in the range 2 to 8, y in the range 0 to 4), of nickel formate compounds Ni(CH$_2$O)$_2$, xH$_2$O (x in the range 0 to 2) are given in the appropriate ICDD tables.

The catalyst may also be present in the reduced fowl passivated in air. In this case the catalyst diffractogram may, in addition to the peaks cited above, present the characteristic peaks of nickel in the reduced form. The positions of the nickel peaks, Ni, are, for example, reported in table 00-004-0850. They are as follows, in d $(10^{-10}$ m): 2.03, 1.76, 1.25, 1.06, 1.02, 0.88, 0.81, and 0.79.

The catalyst may be in a form passivated with sulphur-containing compounds in accordance with methods which are known to the skilled person and in particular, for example, in accordance with one of the methods described in one of patents EP-0 466 567 (B1), U.S. Pat. No. 5,153,163, FR-2 676 184, WO-2004/098774.

In this case, the X ray diffractogram of the catalyst may also, in addition to the peaks listed above, include the characteristic peaks of nickel in the sulphide form. The positions of the peaks of the nickel sulphide Ni$_x$S$_y$ compounds (x in the range 1 to 9, y in the range 1 to 8) are given in the appropriate ICDD tables.

Preparation of Support

In accordance with a first variation of the supports of the invention, alumina agglomerates are present in the form of beads. In this first variation, preparation of the support comprises the following steps:

s1) dehydration by flash calcining an aluminium hydroxide or oxyhydroxide, preferably hydrargillite, to obtain an active alumina powder;

Flash calcining is intense and rapid heating which results in brutal dehydration of an aluminium hydroxide (hydrargillite, gibbsite or bayerite) or an aluminium oxyhydroxide (boehmite or diaspore) by means of a stream of hot gas to eliminate and very rapidly entrain the water which is evaporated off. The temperature is in the range 400° C. to 1200° C., preferably in the range 600° C. to 900° C., and the period is in the range from a fraction of a second to 5 seconds, preferably in the range 0.1 second to 4 seconds. The preferred starting compound is hydrargillite. Experience shows that this compound is the most favorable for obtaining a final product with the desired properties. Moreover, it is relatively cheap.

Generally, the active alumina powder obtained after dehydration of the aluminium hydroxide or oxyhydroxide is ground.

Generally, the active alumina powder obtained after dehydration of the aluminium hydroxide or oxyhydroxide is washed with water or an aqueous acid solution;

s2) forming said active alumina powder to obtain beads with a green packing density in the range 500 to 1100 kg/m$^3$, preferably included between 700 and 950 kg/m$^3$, and with a diameter primarily in the range 0.8 to 10 mm, preferably in the range 1 to 5 mm;

Forming said active alumina powder to obtain beads, termed granulation, is generally carried out using a rotary technique such as a rotary granulator or a rotary drum. Such processes can produce beads with controlled diameters and pore distributions, said dimensions and said distributions generally being created during the agglomeration step. The porosity may be created by different means, such as by selecting the granulometry of the alumina powder or agglomeration of several alumina powders with different granulometries. Another method consists of mixing one or more compounds termed porogens with the alumina powder before or during the agglomeration step, which porogens disappear on heating and thus create the pores in the beads. Examples of porogenic compounds which may be cited are wood flour, wood charcoal, sulphur, tars, plastic materials or emulsions of plastic materials such as polyvinyl chloride, polyvinyl alcohols, naphthalene or the like. The quantity of porogenic compounds added is determined by the desired volume.

During forming of said alumina powder, in general one or more porogenic materials are added thereto which disappear on heating. Said porogenic materials are selected from the group constituted by wood flour, wood charcoal, sulphur, tars, plastic materials and emulsions of plastic materials, polyvinyl alcohols and naphthalene;

s3) heat treatment, at a temperature in the range 200° C. to 1200° C., preferably in the range 400° C. to 900° C., of said beads to produce a specific surface area in the range 50 to 420 $m^2/g$;

s4) hydrothermal treatment of said beads by impregnation with water or an aqueous solution, preferably acidic, then placing them in an autoclave at a temperature in the range 100° C. to 300° C., preferably in the range 150° C. to 250° C.;

The hydrothermal treatment is generally carried out at a temperature of 100° C. to 300° C., preferably 150° C. to 250° C., for a period of more than 45 minutes, preferably 1 to 24 hours, more preferably 1.5 to 12 hours. The hydrothermal treatment is generally carried out using an aqueous acidic solution comprising one or more mineral and/or organic acids, preferably nitric acid, hydrochloric acid, perchloric acid, sulpuric acid, or weak acids with a pH in solution of less than 4, such as acetic acid or formic acid. Generally, said aqueous acidic solution also comprises one or more compounds which can liberate anions which are capable of combining with aluminium ions, preferably compounds comprising a nitrate (such as aluminium nitrate), chloride, sulphate, perchlorate, chloroacetate, trichloroacetate, bromoacetate, dibromoacetate ion, and anions with general formula: R—COO such as formates or acetates;

s5) calcining the agglomerates obtained at a temperature in the range 850° C. to 1100° C., preferably in the range 875° C. to 1075° C.

This calcining is generally carried out in order to obtain a specific surface area for the support in the range 30 to 130 $m^2/g$ and to obtain the desired X ray diffractogram.

In accordance with a second variation of the supports of the invention, the alumina agglomerates are in the form of extruded materials. In this second variation, the support comprises the following steps:

s1) mixing and extruding an alumina-based material in order to form it;

In general, said alumina-based material is dehydrated hydrargillite. The alumina-based material may also generally be derived from the precipitation of boehmite, pseudo-boehmite or bayerite, or a mixture of said materials.

When forming said alumina-based material, in general one or more porogenic materials is/are added which disappears on heating. Said porogenic materials are selected from the group constituted by wood flour, wood charcoal, sulphur, tars, plastic materials or emulsions of plastic materials, polyvinyl alcohols, and naphthalene;

s2) heat treatment at a temperature in the range 200° C. to 1200° C. of the extruded materials obtained, to provide them with a specific surface area in the range 50 to 420 $m^2/g$;

s3) hydrothermal treatment of said extruded materials by impregnation with water or an aqueous solution, preferably acidic, then placing them an autoclave at a temperature in the range 100° C. to 300° C., preferably in the range 150° C. to 250° C.;

The hydrothermal treatment is generally carried out at a temperature of 100° C. to 300° C., preferably 150° C. to 250° C., for a period of more than 45 minutes, preferably 1 to 24 hours, more preferably 1.5 to 12 hours. The hydrothermal treatment is generally carried out using an aqueous acidic solution comprising one or more mineral and/or organic acids, preferably nitric acid, hydrochloric acid, perchloric acid, sulpuric acid, or weak acids with a pH in solution of less than 4, such as acetic acid or formic acid. Generally, said aqueous acidic solution also comprises one or more compounds which can liberate anions which are capable of combining with aluminium ions, preferably compounds comprising a nitrate (such as aluminium nitrate), chloride, sulphate, perchlorate, chloroacetate, trichloroacetate, bromoacetate or dibromoacetate ion, and anions with general formula: R—COO such as formates or acetates;

s4) calcining the agglomerates obtained at a temperature in the range 850° C. to 1100° C., preferably in the range 875° C. to 1075° C.

This calcining is generally carried out in order to obtain a specific surface area for the support in the range 30 to 130 $m^2/g$ and to obtain the desired X ray diffractogram.

Preparation of Catalysts

The catalysts are prepared using any method which is known to the skilled person.

c1) Preparation of a Solution Comprising Nickel

The nickel precursor salt is generally selected from the group constituted by nickel chloride, nickel nitrate and nickel sulphate. Highly preferably, the nickel precursor salt is nickel nitrate. The solution is prepared by dissolving the nickel precursor at a concentration in the range from 0 to the solubility limit of the precursor used. The concentration is adjusted as a function of the desired quantity by weight of nickel in the catalyst.

C2) Impregnation of Solution into Alumina Support

The alumina support may be impregnated using dry or excess impregnation, in static or dynamic mode. Impregnation may be carried out in one or more successive impregnation steps.

C3) Drying the Catalyst

The impregnated catalyst is generally dried in order to eliminate all or part of the water introduced during impregnation, preferably at a temperature in the range 50° C. to 250° C., more preferably in the range 70° C. to 200° C. Drying is carried out in air or in an inert atmosphere (for example nitrogen).

C4) Calcining the Catalyst

The catalyst is then generally calcined in air. The calcining temperature is generally in the range 250° C. to 900° C., preferably in the range from approximately 300° C. to approximately 500° C. The calcining period is generally in the range 0.5 hours to 5 hours.

C5) Activation by Reduction of Catalyst Obtained in Preceding Step (Optional Step)

The catalyst obtained at the end of step C3) or C4) is generally reduced. This step is preferably carried out in the presence of a reducing gas, preferably by means of in situ gaseous hydrogen, i.e. in the reactor where the catalytic transformation is carried out. Preferably, this step is carried out at a temperature in the range 100° C. to 600° C., more preferably in the range 200° C. to 500° C.

C5') Passivation-Activation (Optional Step)

In a variation, the nickel catalysts are passivated after step C3) or C4) using sulphur and any method which is known to the skilled person. As an example, nickel-based catalysts may be activated ex situ using one of the methods described in EP-0 466 567 (B1), U.S. Pat. No. 5,153,163 and FR-2 676 184. The catalyst is then generally reduced, preferably in gaseous hydrogen at a temperature in the range 100° C. to 400° C., more preferably in the range 150° C. to 350° C.

In a variation described in U.S. Pat. No. 5,153,163, the nickel catalysts are passivated at the end of step C3) or C4) using sulphur. A volume of an aqueous solution which corresponds to the pore volume of the catalyst to be impregnated and containing di-ethanol di-sulphide (DEODS) and formic acid can be prepared. The quantity of sulphur introduced is generally adjusted so as to introduce an average of between 0.25 and 0.35, preferably 0.3 moles of sulphur per mole of nickel to the surface of the nickel particles. This solution is then impregnated into the catalyst obtained. The catalyst then generally undergoes a heat treatment at a temperature in the range 100° C. to 250° C. for a period in the range 0.5 to 1.5 hours.

In another catalyst preparation variation, the catalyst is prepared using several impregnation steps.

For catalysts prepared in two impregnation steps, the following series may be used:
 impregnation no 1—drying—impregnation no 2—drying—calcining;
 impregnation no 1—drying—calcining—impregnation no 2—drying—calcining.

The invention also concerns the catalyst obtained from the catalyst preparation processes described in the present invention.

Characterization of Support

The diagrams for the various supports were recorded on a diffractometer (X'PERT'Pro from PANalytical) in Bragg-Brentano geometry, provided with a copper tube (1.54 Å), a proportional counter and slits the openings of which can be varied as a function of 2θ. The surface area of the irradiated sample was 10×10 mm; the sampling interval was 0.05° 2θ; the time per interval was 5 to 15 s.

After recording, the intensities were corrected and transformed into intensities at a constant irradiated volume.

The measurement for the positions, relative intensities and widths of the diffracted peaks were determined by complete modelling of the diffractograms using pseudo-Voigt type symmetrical analytical functions, with a Gauss-Lorentz ratio fixed at 0.6.

The positions, intensities and widths of the functions were affined to adjust the calculated profiles to the experimental peaks.

The affined parameters for the calculated peaks qualified the experimental peaks:
 positions (interplanar spacings)
 intensity
 FWHM (full width at half the maximum).

A linear diffuse background was lined up at the same time as the peak profiles. Certain extremely wide low intensity peaks which are vital to the quality of the affinement of the experimental diagram but which were clearly non-defined were considered to be a supplement to the diffusion background.

The relative intensities reported here are expressed as a percentage of the height of the most intense peak (d=1.39 Å) above the diffusion background.

The widths of the peaks were qualified (fine (F), normal (N), wide (W), very wide (VW)) using the FWHM, full width at half the maximum of the profile calculated for each experimental peak. The widths expressed as 2θ are dependent on the apparatus used for analysis and the wavelength used for analysis. In contrast, the peak qualification (fine (F), normal (N), wide (W), very wide (VW)) deduced from these values is valid regardless of the type of apparatus and the analysis conditions employed. The relative classification of the peaks with respect to their full width at half the maximum with respect to each other is valid regardless of the type of apparatus and the analysis conditions employed.

The qualification of the peak widths is given below:

| Full width at half the maximum, under our analysis conditions (in 2 theta degrees) | Qualification of peak width |
| --- | --- |
| <0.7 | Fine (F) |
| 0.7-1.0 | Normal (N) |
| 1-1.8 | Wide (W) |
| 1.8-3 | Very wide (VW) |

For the catalysts of the invention comprising nickel on an aluminium oxide support, the aluminium oxide support generally has, in the calcined state, a diffractogram obtained by X ray diffractometry comprising peaks which correspond to the following interplanar spacings, relative intensities and peak widths:

| Interplanar spacings d ($10^{-10}$ m) | Relative intensities $I/I_0$ (%) | Peak width |
| --- | --- | --- |
| 5.03 to 5.22 | 1-5 | N to VW |
| 4.56 to 4.60 | 1-10 | F to VW |
| 4.06 to 4.10 | 1-5 | N to W |
| 2.80 to 2.85 | 5-20 | VW |
| 2.73 | 15-35 | N |
| 2.60 | 5-10 | W |
| 2.43 | 35-40 | VW |
| 2.29 | 30-40 | N |
| 1.99 | 60-95 | N |
| 1.95 | 25-50 | F to N |
| 1.79 | 1-10 | N to VW |
| 1.53 | 5-10 | N to W |
| 1.51 | 5-10 | W to VW |
| 1.41 | 40-60 | N to W |
| 1.39 | 100 | N |
| 1.23 to 1.26 | 1-5 | VW |
| 1.14 | 5-10 | N to W |
| 1.11 | 1-5 | W |
| 1.04 | 1-5 | VW |
| 1.00 | 5-10 | VW |
| 0.97 | 1-5 | W to VW |

In a preferred mode, in the calcined state the alumina support has a diffractogram comprising only the peaks which correspond to the following interplanar spacings, relative intensities and peak widths:

| Interplanar spacings d ($10^{-10}$ m) | Relative intensities $I/I_0$ (%) | Peak width |
|---|---|---|
| 5.41 to 5.47 | 0-5 | N |
| 5.03 to 5.22 | 1-5 | N to VW |
| 4.56 to 4.60 | 1-10 | F to VW |
| 4.06 to 4.10 | 1-5 | N to W |
| 2.86 to 2.88 | 5-20 | F to N |
| 2.80 to 2.85 | 5-20 | VW |
| 2.73 | 15-35 | N |
| 2.60 | 5-10 | W |
| 2.43 | 35-40 | VW |
| 2.29 | 30-40 | N |
| 1.99 | 60-95 | N |
| 1.95 | 25-50 | F to N |
| 1.92 | 0-20 | N to VW |
| 1.79 | 1-10 | N to W |
| 1.53 | 5-10 | N to W |
| 1.51 | 5-10 | W to VW |
| 1.45 | 0-10 | W |
| 1.43 | 0-10 | W |
| 1.41 | 40-60 | N to W |
| 1.39 | 100 | N |
| 1.23 to 1.26 | 1-5 | VW |
| 1.14 | 5-10 | N to W |
| 1.11 | 1-5 | W |
| 1.04 | 1-5 | VW |
| 1.00 | 5-10 | VW |
| 0.97 | 1-5 | W to VW |

Further, the ratio of the relative intensities at respective interplanar spacings of $1.99 \times 10^{-10}$ m and $1.95 \times 10^{-10}$ m is such that:

$(I/I_0)_{1.99}/(I/I_0)_{1.95}$ is in the range 1.2 to 3.8, preferably in the range 1.5 to 2.5.

Use of Catalyst of the Invention

The catalyst of the invention may be used in processes which involve a transformation of organic compounds. Thus, the catalyst of the invention may be used in processes comprising the hydrogenation of compounds comprising aromatic, ketone, aldehyde, acid or nitro functions, the hydrogenation of carbon monoxide to $C_1$-$C_6$ alcohols, to methanol or to dimethyl ether, isomerization or hydroisomerization reactions, hydrogenolysis reactions, and in general reactions which involve cleavage or the formation of carbon-carbon bonds.

The operating conditions which are generally employed for these reactions are as follows: a temperature in the range 0° C. to 500° C., preferably in the range 25° C. to 350° C., a pressure in the range 0.1 to 20 MPa, preferably in the range 0.1 to 10 MPa, an hourly space velocity (HSV) in the range 0.1 to 50 h$^{-1}$, preferably in the range 0.5 to 20 h$^{-1}$ for a liquid feed; and between 500 and 30000 h$^{-1}$, preferably in the range 500 to 15000 h$^{-1}$, for a gas feed. When hydrogen is present, the hydrogen to feed mole ratio is in the range 1 to 500 liters per liter, preferably in the range 10 to 150 liters per liter.

The use of the catalyst of the invention and the conditions of its use must be adapted by the user to the reaction and technology employed.

The catalyst of the invention may also be used in reactions for the hydrogenation of compounds comprising acetylene, diene or olefin functions.

The invention also concerns a process for selective hydrogenation by bringing a feed into contact with a catalyst of the invention or a catalyst prepared in accordance with the invention, said feed being selected from the group constituted by C3 steam cracking cuts, C4 steam cracking cuts, C5 steam cracking cuts and steam cracking gasolines, also termed pyrolysis gasolines.

In accordance with a preferred application, the catalysts of the invention are used for reactions for the selective hydrogenation of polyunsaturated hydrocarbon cuts derived from steam cracking and/or catalytic cracking, preferably polyunsaturated hydrocarbon cuts derived from steam cracking.

Hydrogenation of C3 to C5 Cuts

Hydrocarbon conversion processes such as steam cracking or catalytic cracking are operated at high temperature and produce a wide variety of unsaturated molecules such as ethylene, propylene, linear butenes, isobutene, pentenes as well as unsaturated molecules containing up to about 15 carbon atoms.

In parallel, polyunsaturated compounds are also formed: acetylene, propadiene and methylacetylene (or propyne), 1-2 and 1-3 butadiene, vinylacetylene and ethylacetylene, and other polyunsaturated compounds with a boiling point corresponding to the C5+ gasoline fraction.

All of these polyunsaturated compounds must be eliminated to allow these various cuts to be used in petrochemical processes such as polymerization units.

Thus, for example, the C3 steam cracking cut may have the following mean composition: of the order of 90% by weight of propylene, of the order of 3% to 8% by weight of propadiene and methylacetylene, the remainder being essentially propane. In certain C3 cuts, between 0.1% and 2% by weight of C2 and C4 may also be present. The specifications concerning the concentrations of these polyunsaturated compounds for petrochemicals and polymerization units are very low: 20-30 ppm by weight of methylacetylene and propadiene, MAPD, for chemical quality propylene and less than 10 ppm by weight or even down to 1 ppm by weight for the "polymerization" quality.

A C4 steam cracking cut has, for example, the following mean molar composition: 1% of butane, 46.5% of butene, 51% of butadiene, 1.3% of vinylacetylene (VAC) and 0.2% of butyne. In certain C4 cuts, between 0.1% and 2% by weight of C3 and C5 may also be present. Here again, the specifications are severe: the diolefins content is strictly less than 10 ppm by weight for a C4 cut which will be used in petrochemicals or polymerization.

A C5 steam cracking cut has, for example, the following mean composition by weight: 21% of pentanes, 45% of pentenes, 34% of pentadienes.

The selective hydrogenation process is progressively imposed to eliminate polyunsaturated compounds from the C3 to C5 oil cuts cited as this process can convert the most unsaturated compounds to the corresponding alkenes and avoid total saturation and thus the formation of the corresponding alkanes.

Selective hydrogenation may be carried out in the gas or liquid phase, preferably in the liquid phase. In fact, a liquid phase reaction can reduce the energy cost and increase the cycle time for the catalysts.

For a liquid phase reaction, the pressure is generally in the range 1 to 3 MPa, the temperature is in the range 2° C. to 50° C. and the hydrogen/(polyunsaturated compounds to be hydrogenated) molar ratio is in the range 0.1 to 4, preferably in the range 1 to 2.

For a gas phase hydrogenation reaction, the pressure is generally in the range 1 to 3 MPa, the temperature is in the range 40° C. to 120° C. and the hydrogen/(polyunsaturated compounds to be hydrogenated) molar ratio is in the range 0.1 to 4, preferably in the range 1 to 2.

Hydrogenation of Steam Cracked Gasoline

Steam cracking principally produces ethylene, propylene, a C4 cut and steam cracked gasoline which is also known as pyrolysis gasoline.

In accordance with a further preferred mode, the feed is a pyrolysis gasoline. Pyrolysis gasoline corresponds to a cut with a boiling point which is generally in the range 0° C. to 250° C., preferably in the range 10° C. to 220° C. This feed generally comprises the C5-C12 cut with traces of C3, C4, C13, C14, C15 (for example in the range 0.1% to 3% by weight for each of these cuts).

As an example, a C5-200° C. cut generally has the following composition, as a % by weight:
Paraffins: 8-12
Aromatics: 58-62
Mono-olefins: 8-10
Diolefins: 18-22
Sulphur 20-300 ppm Selective hydrogenation of a pyrolysis gasoline consists of bringing the feed to be treated into contact with hydrogen introduced in excess into one or more reactors containing the hydrogenation catalyst.

The hydrogen flow rate is adjusted in order to provide a sufficient quantity for theoretical hydrogenation of all of the diolefins, acetylenes and alkenyl aromatics and to maintain an excess of hydrogen at the reactor outlet. In order to limit the temperature gradient in the reactor, it may be advantageous to recycle a fraction of the effluent to the inlet and/or to the centre of the reactor.

In the case of the selective hydrogenation of pyrolysis gasoline, the hydrogen/(polyunsaturated compounds to be hydrogenated) molar ratio is generally in the range 1 to 2, the temperature is generally in the range 40° C. to 200° C., preferably in the range 50° C. to 180° C., the hourly space velocity (corresponding to the volume of hydrocarbon per volume of catalyst per hour) is generally in the range $0.5\ h^{-1}$ to $10\ h^{-1}$, preferably in the range $1\ h^{-1}$ to $5\ h^{-1}$, and the pressure is generally in the range 1.0 MPa to 6.5 MPa, preferably in the range 2.0 MPa to 3.5 MPa.

EXAMPLE

Example 1

Catalyst A (in Accordance with the Invention)

The support for catalyst A was prepared using the first variation of the support preparation mode. The steps for preparing the support for catalyst A in the form of beads were as follows:

s1) dehydration by flash calcining hydrargillite to obtain an active alumina powder. A stream of hot gas meant that the evaporated water was eliminated and entrained very rapidly. The temperature was fixed at 800° C. and the contact time for the material to be dehydrated by the gas was 1 second. The active alumina powder obtained was ground then washed with water;

s2) forming said active alumina powder to obtain beads with a green packing density of 785 kg/m$^3$ and a diameter which is primarily in the range 2 to 4 mm;

Forming said active alumina powder to obtain beads, termed granulation, was carried out using a rotary bowl granulator;

s3) heat treatment of said beads at 720° C. to produce a specific surface area of 200 m$^2$/g;

s4) hydrothermal treatment of said beads by impregnation with an aqueous acid solution. The hydrothermal treatment was carried out at a temperature of 200° C. for 6.5 hours, in a rotary basket autoclave, and the impregnation solution was an aqueous acidic solution comprising aluminium nitrate;

s5) calcining the agglomerates obtained at a temperature of 950° C. for 2 hours. The agglomerates obtained had a specific surface area of 67 m$^2$/g.

The XRD signature of the prepared support was as follows:

| d (Å) ± 0.01 | I/I$_0$ (%) | Peak width |
|---|---|---|
| 5.18 | 3 | VW |
| 4.58 | 4 | VW |
| 4.09 | 1 | W |
| 2.81 | 14 | VW |
| 2.73 | 17 | N |
| 2.61 | 7 | W |
| 2.43 | 35 | VW |
| 2.29 | 31 | N |
| 1.99 | 73 | N |
| 1.95 | 38 | N |
| 1.79 | 5 | VW |
| 1.53 | 6 | W |
| 1.51 | 6 | W |
| 1.41 | 41 | N |
| 1.39 | 100 | N |
| 1.26 | 3 | VW |
| 1.14 | 7 | W |
| 1.11 | 1 | W |
| 1.04 | 5 | VW |
| 1.00 | 8 | VW |
| 0.97 | 3 | VW |

An aqueous solution of nickel nitrate Ni(NO$_3$)$_2$ was prepared at 25° C. by diluting 49.5 g of nickel hydrate hexahydrate in demineralised water to a volume which corresponded to the pore volume of the alumina support. This solution was then impregnated into 100 grams of prepared alumina support.

Catalyst A obtained was dried in air at 120° C. then calcined for 2 hours at 450° C. in air. Catalyst A contained 10% by weight of nickel.

Example 2

Catalyst B (Not in Accordance with the Invention)

The support for catalyst B was prepared in accordance with the first variation of the support preparation mode. The operating conditions and the method for preparing the support were the same as those used in Example 1 with the exception that the calcining of step s5) was carried out at 650° C. for 2 hours. It provided the agglomerates with a specific surface area of 142 m$^2$/g.

The XRD signature of the prepared support was as follows:

| d (Å) ± 0.01 | I/I$_0$ (%) | Peak width |
|---|---|---|
| 4.55 | 7 | VW |
| 2.73 | 19 | VW |
| 2.41 | 49 | VW |
| 2.28 | 23 | F |
| 2.12 | 8 | VW |
| 1.99 | 54 | W |
| 1.95 | 31 | N |
| 1.52 | 14 | VW |
| 1.41 | 22 | VW |
| 1.39 | 100 | W |

An aqueous solution of nickel nitrate Ni(NO$_3$)$_2$ was prepared at 25° C. by diluting 75.4 g of nickel hydrate hexahydrate in demineralised water to a volume which corresponded to the pore volume of the prepared alumina support. This solution was then impregnated into 100 grams of prepared alumina support.

Catalyst B obtained was dried in air at 120° C. then was calcined for 2 hours at 450° C. in air. Catalyst B contained 15% by weight of nickel.

Example 3

Catalyst C (in Accordance with the Invention)

As described in U.S. Pat. No. 5,153,163, a volume of an aqueous solution was prepared which corresponded to the pore volume of the catalyst to be impregnated and contained 1.7 g of diethanol disulphide (DEODS) and 10.2 g of formic acid. The quantity of sulphur introduced was adjusted so as to introduce a mean of 0.3 moles of sulphur per mole of nickel to the surface of the nickel particles. This solution was then impregnated into 100 g of catalyst A. The catalyst then underwent a heat treatment at 150° C. for 1 hour. Catalyst C so prepared contained 10% by weight of Ni and 0.7% by weight of sulphur.

Example 5

Catalyst D (Not in Accordance with the Invention)

As described in U.S. Pat. No. 5,153,163, a volume of an aqueous solution was prepared which corresponded to the pore volume of the catalyst to be impregnated and contained 3.6 g of diethanol disulphide (DEODS) and 15.6 g of formic acid. The quantity of sulphur introduced was adjusted so as to introduce a mean of 0.3 moles of S per mole of nickel to the surface of the nickel particles. This solution was then impregnated into 100 g of catalyst B. The catalyst then underwent a heat treatment at 150° C. for 1 hour. Catalyst D so prepared contained 15% by weight of Ni and 1.4% by weight of sulphur.

Example 6

Catalytic Test for Hydrogenation of a Styrene-Isoprene Mixture in the Presence of S Prior to the catalytic test, catalysts A and B were treated in a stream of 1 liter of hydrogen per hour and per gram of catalyst with a temperature rise of 300° C./h and a constant temperature stage at 410° C. for 16 hours.

Prior to the catalytic test, catalysts C and D were treated in a stream of 1 liter of hydrogen per hour and per gram of catalyst with a temperature rise of 300° C./h and a constant temperature stage at 300° C. for 16 hours.

The catalysts then underwent a hydrogenation test in a perfectly stirred "Grignard" type batch reactor. To this end, 4 ml of reduced catalyst beads were fixed in the absence of air in an annular basket located around a stirring arm. The baskets used in the reactors were of the Robinson Mahoney type.

Hydrogenation was carried out in the liquid phase.

The feed had the following composition: 8% by weight styrene, 8% by weight isoprene, 10 ppm of S introduced in the form of pentanethiol, 100 ppm of S introduced in the form of thiophene; the solvent was n-heptane.

The test was carried out at a constant pressure of 3.5 MPa of hydrogen and a temperature of 60° C. The reaction products were analyzed by gas chromatography.

The catalytic activities were expressed in moles of $H_2$ consumed per minute and per gram of nickel and are shown in Table 1.

TABLE 1

Measured activities for hydrogenation of a styrene-isoprene mixture in the presence of sulphur

| Catalyst | Activity* |
|---|---|
| Catalyst A (in accordance) | $7.4 \times 10^{-3}$ |
| Catalyst B (not in accordance) | $4.7 \times 10^{-3}$ |
| Catalyst C (in accordance) | $7.3 \times 10^{-3}$ |
| Catalyst D (not in accordance) | $3.5 \times 10^{-3}$ |

*(moles $H_2$)/[min × (grams of nickel)]

Catalysts A and C, in accordance with the invention, are approximately 1.5 to 2 times more active than catalysts B and D, not in accordance.

The invention claimed is:

1. A catalyst comprising nickel on an aluminum oxide support, said aluminum oxide support having, in the calcined state, a diffractogram obtained by X ray diffractometry comprising peaks which correspond to the following interplanar spacings d and relative intensities $I/I_0$:

| Interplanar spacings d ($10^{-10}$ m) | Relative intensities $I/I_0$ (%) |
|---|---|
| 5.03 to 5.22 | 1-5 |
| 4.56 to 4.60 | 1-10 |
| 4.06 to 4.10 | 1-5 |
| 2.80 to 2.85 | 5-20 |
| 2.73 | 15-35 |
| 2.60 | 5-10 |
| 2.43 | 35-40 |
| 2.29 | 30-40 |
| 1.99 | 60-95 |
| 1.95 | 25-50 |
| 1.79 | 1-10 |
| 1.53 | 5-10 |
| 1.51 | 5-10 |
| 1.41 | 40-60 |
| 1.39 | 100 |
| 1.23 to 1.26 | 1-5 |
| 1.14 | 5-10 |
| 1.11 | 1-5 |
| 1.04 | 1-5 |
| 1.00 | 5-10 |
| 0.97 | 1-5. |

2. A catalyst according to claim 1, wherein the aluminum oxide support has, in the calcined state, a diffractogram comprising only the following peaks which correspond to the following interplanar spacings and relative intensities:

| Interplanar spacings d ($10^{-10}$ m) | Relative intensities $I/I_0$ (%) |
|---|---|
| 5.41 to 5.47 | 0-5 |
| 5.03 to 5.22 | 1-5 |
| 4.56 to 4.60 | 1-10 |
| 4.06 to 4.10 | 1-5 |
| 2.86 to 2.88 | 5-20 |
| 2.80 to 2.85 | 5-20 |
| 2.73 | 15-35 |
| 2.60 | 5-10 |
| 2.43 | 35-40 |
| 2.29 | 30-40 |
| 1.99 | 60-95 |
| 1.95 | 25-50 |
| 1.92 | 0-20 |
| 1.79 | 1-10 |
| 1.53 | 5-10 |
| 1.51 | 5-10 |
| 1.45 | 0-10 |
| 1.43 | 0-10 |

-continued

| Interplanar spacings d ($10^{-10}$ m) | Relative intensities $I/I_0$ (%) |
|---|---|
| 1.41 | 40-60 |
| 1.39 | 100 |
| 1.23 to 1.26 | 1-5 |
| 1.14 | 5-10 |
| 1.11 | 1-5 |
| 1.04 | 1-5 |
| 1 | 5-10 |
| 0.97 | 1-5. |

3. A catalyst according to claim 2, wherein the aluminum oxide support has, in the calcined state, a diffractogram comprising only the peaks which correspond to the following interplanar spacings, relative intensities and peak widths:

| Interplanar spacings d ($10^{-10}$ m) | Relative intensities $I/I_0$ (%) | Peak width |
|---|---|---|
| 5.41 to 5.47 | 0-5 | N |
| 5.03 to 5.22 | 1-5 | N to VW |
| 4.56 to 4.60 | 1-10 | F to VW |
| 4.06 to 4.10 | 1-5 | N to W |
| 2.86 to 2.88 | 5-20 | F to N |
| 2.80 to 2.85 | 5-20 | VW |
| 2.73 | 15-35 | N |
| 2.60 | 5-10 | W |
| 2.43 | 35-40 | VW |
| 2.29 | 30-40 | N |
| 1.99 | 60-95 | N |
| 1.95 | 25-50 | F to N |
| 1.92 | 0-20 | N to VW |
| 1.79 | 1-10 | N to W |
| 1.53 | 5-10 | N to W |
| 1.51 | 5-10 | W to VW |
| 1.45 | 0-10 | W |
| 1.43 | 0-10 | N |
| 1.41 | 40-60 | N to W |
| 1.39 | 100 | N |
| 1.23 to 1.26 | 1-5 | VW |
| 1.14 | 5-10 | N to W |
| 1.11 | 1-5 | W |
| 1.04 | 1-5 | VW |
| 1.00 | 5-10 | VW |
| 0.97 | 1-5 | W to VW. |

4. A catalyst according to claim 1, wherein the aluminum oxide support has, in the calcined state, a diffractogram comprising peaks which correspond to the following interplanar spacings, relative intensities and peak widths:

| Interplanar spacings d ($10^{-10}$ m) | Relative intensities $I/I_0$ (%) | Peak width |
|---|---|---|
| 5.03 to 5.22 | 1-5 | N to VW |
| 4.56 to 4.60 | 1-10 | F to VW |
| 4.06 to 4.10 | 1-5 | N to W |
| 2.80 to 2.85 | 5-20 | VW |
| 2.73 | 15-35 | N |
| 2.60 | 5-10 | W |
| 2.43 | 35-40 | VW |
| 2.29 | 30-40 | N |
| 1.99 | 60-95 | N |
| 1.95 | 25-50 | F to N |
| 1.79 | 1-10 | N to VW |
| 1.53 | 5-10 | N to W |
| 1.51 | 5-10 | W to VW |
| 1.41 | 40-60 | N to W |
| 1.39 | 100 | N |
| 1.23 to 1.26 | 1-5 | VW |
| 1.14 | 5-10 | N to W |
| 1.11 | 1-5 | W |
| 1.04 | 1-5 | VW |
| 1.00 | 5-10 | VW |
| 0.97 | 1-5 | W to VW. |

5. A catalyst according to claim 1, wherein the quantity of nickel in the catalyst is in the range 1% to 50% by weight and the specific surface area of the support is in the range 30 to 130 m$^2$/g.

6. A catalyst according to claim 1, wherein in addition to the characteristic peaks of the support, the diffractogram for the catalyst in the oxide form comprises the characteristic peaks of nickel in the oxide form at the following interplanar spacings d (expressed in $10^{-10}$ m): 2.41, 2.09, 1.48, 1.25, 1.21, 1.04, 0.96, 0.93, 0.85, 0.80.

7. A catalyst according to claim 1, wherein in addition to the characteristic peaks of the support, the diffractogram for the catalyst in the reduced form passivated in air comprises the characteristic peaks of nickel in the reduced form, at the following interplanar spacings d (in $10^{-10}$ m): 2.03, 1.76, 1.25, 1.06, 1.02, 0.88, 0.81, 0.79.

8. A catalyst according to claim 1, wherein the ratio of the relative intensities at respective interplanar spacings of $1.99 \times 10^{-10}$ m and $1.95 \times 10^{-10}$ m is such that $(I/I_0)_{1.99}/(I/I_0)_{1.95}$ is in the range of 1.2 to 3.8.

9. A process for preparing a catalyst according to claim 1, wherein the support is an agglomerate of alumina in the form of beads, said process comprising the following steps:
- s1) dehydration by flash calcining an aluminum hydroxide or oxyhydroxide, to obtain an active alumina powder; said flash calcining being heating with a stream of hot gas at a temperature in the range of 400° C. to 1200° C., for a period in the range of 0.1 second to 5 seconds;
- s2) forming said active alumina powder to obtain beads with a green packing density in the range of 500 to 1100 kg/m$^3$, and with a diameter primarily in the range of 0.8 to 10 mm;
- s3) heat treatment of said beads, at a temperature in the range of 200° C. to 1200° C., to provide said beads with a specific surface area in the range of 50 to 420 m$^2$/g;
- s4) hydrothermal treatment of said beads by impregnation with water or an aqueous solution, then placing them in an autoclave at a temperature in the range of 100° C. to 300° C. for a period of more than 45 minutes;
- s5) calcining the agglomerates obtained at a temperature in the range of 850° C. to 1100° C.

10. A process for preparing a catalyst according to claim 9, wherein the active alumina powder obtained after dehydration of the aluminum hydroxide or oxyhydroxide is ground.

11. A process for preparing a catalyst according to claim 9, wherein the active alumina powder obtained after dehydration of the aluminium hydroxide or oxyhydroxide is washed with water or an aqueous acidic solution.

12. A process for preparing a catalyst according to claim 9, wherein during forming of said alumina powder or said alumina-based material, one or more porogenic materials is added thereto.

13. A process for preparing a catalyst according to claim 12, wherein said porogenic materials are selected from the group constituted by wood flour, wood charcoal, sulphur, tars, plastic materials, emulsions of plastic materials, polyvinyl alcohols and naphthalene.

14. A process for preparing a catalyst according to claim 9, wherein the hydrothermal treatment is carried out using an aqueous acidic solution comprising one or more mineral and/or organic acids.

15. A process for preparing a catalyst according to claim 14, wherein the hydrothermal treatment is carried out using an aqueous acidic solution comprising at least one acid selected from the group constituted by nitric acid, hydrochloric acid, perchloric acid, sulphuric acid, acetic acid and formic acid.

16. A process for preparing a catalyst according to claim 1, wherein the support is an agglomerate of alumina in the form of extruded materials, said process comprising the following steps:
   s1) mixing and extruding an alumina-based material;
   s2) heat treatment of the extruded materials obtained, at a temperature in the range of 200° C. to 1200° C., to provide the extruded materials with a specific surface area in the range of 50 to 420 m²/g;
   s3) hydrothermal treatment of said extruded materials by impregnation with water or an aqueous solution, then placing the resultant impregnated materials in an autoclave at a temperature in the range of 100° C. to 300° C. for a period of more than 45 minutes;
   s4) calcining the agglomerates obtained at a temperature in the range of 850° C. to 1100° C.

17. A process for preparing a catalyst according to claim 16, wherein said alumina-based material is dehydrated hydrargillite.

18. A process for preparing a catalyst according to claim 16, wherein said alumina-based material is derived from the precipitation of boehmite, pseudo-boehmite or bayerite or a mixture of said materials.

19. In a catalytic selective hydrogenation process, the improvement wherein a catalyst according to claim 1 is brought into contact with a feed selected from the group constituted by C3 steam cracking cuts, C4 steam cracking cuts, C5 steam cracking cuts and steam cracked gasolines.

20. An aluminum oxide support having, in the calcined state, a diffractogram obtained by X ray diffractometry comprising peaks which correspond to the following interplanar spacings d and relative intensities $I/I_0$:

| Interplanar spacings D ($10^{-10}$ m) | Relative intensities $I/I_0$ (%) |
|---|---|
| 5.03 to 5.22 | 1-5 |
| 4.56 to 4.60 | 1-10 |
| 4.06 to 4.10 | 1-5 |
| 2.80 to 2.85 | 5-20 |
| 2.73 | 15-35 |
| 2.60 | 5-10 |
| 2.43 | 35-40 |
| 2.29 | 30-40 |
| 1.99 | 60-95 |
| 1.95 | 25-50 |
| 1.79 | 1-10 |
| 1.53 | 5-10 |
| 1.51 | 5-10 |
| 1.41 | 40-60 |
| 1.39 | 100 |
| 1.23 to 1.26 | 1-5 |
| 1.14 | 5-10 |
| 1.11 | 1-5 |
| 1.04 | 1-5 |
| 1.00 | 5-10 |
| 0.97 | 1-5. |

21. An aluminum oxide support according to claim 20, having, in the calcined state, a diffractogram comprising only the following peaks which correspond to the following interplanar spacings and relative intensities:

| Interplanar spacings d ($10^{-10}$ m) | Relative intensities $I/I_0$ (%) |
|---|---|
| 5.41 to 5.47 | 0-5 |
| 5.03 to 5.22 | 1-5 |
| 4.56 to 4.60 | 1-10 |
| 4.06 to 4.10 | 1-5 |
| 2.86 to 2.88 | 5-20 |
| 2.80 to 2.85 | 5-20 |
| 2.73 | 15-35 |
| 2.60 | 5-10 |
| 2.43 | 35-40 |
| 2.29 | 30-40 |
| 1.99 | 60-95 |
| 1.95 | 25-50 |
| 1.92 | 0-20 |
| 1.79 | 1-10 |
| 1.53 | 5-10 |
| 1.51 | 5-10 |
| 1.45 | 0-10 |
| 1.43 | 0-10 |
| 1.41 | 40-60 |
| 1.39 | 100 |
| 1.23 to 1.26 | 1-5 |
| 1.14 | 5-10 |
| 1.11 | 1-5 |
| 1.04 | 1-5 |
| 1 | 5-10 |
| 0.97 | 1-5. |

22. An aluminium aluminum oxide support according to claim 21, having, in the calcined state, a diffractogram comprising only the following peaks which correspond to the following interplanar spacings and relative intensities:

| Interplanar spacings d ($10^{-10}$ m) | Relative intensities $I/I_0$ (%) |
|---|---|
| 5.41 to 5.47 | 0-5 |
| 5.03 to 5.22 | 1-5 |
| 4.56 to 4.60 | 1-10 |
| 4.06 to 4.10 | 1-5 |
| 2.86 to 2.88 | 5-20 |
| 2.80 to 2.85 | 5-20 |
| 2.73 | 15-35 |
| 2.60 | 5-10 |
| 2.43 | 35-40 |
| 2.29 | 30-40 |
| 1.99 | 60-95 |
| 1.95 | 25-50 |
| 1.92 | 0-20 |
| 1.79 | 1-10 |
| 1.53 | 5-10 |
| 1.51 | 5-10 |
| 1.45 | 0-10 |
| 1.43 | 0-10 |
| 1.41 | 40-60 |
| 1.39 | 100 |
| 1.23 to 1.26 | 1-5 |
| 1.14 | 5-10 |

-continued

| Interplanar spacings d ($10^{-10}$ m) | Relative intensities $I/I_0$ (%) |
|---|---|
| 1.11 | 1-5 |
| 1.04 | 1-5 |
| 1 | 5-10 |
| 0.97 | 1-5. |

23. An aluminum oxide support according to claim 20, in the calcined state, a diffractogram comprising peaks which correspond to the following interplanar spacings, relative intensities and peak widths:

| Interplanar spacings d ($10^{-10}$ m) | Relative intensities $I/I_0$ (%) | Peak width |
|---|---|---|
| 5.03 to 5.22 | 1-5 | N to VW |
| 4.56 to 4.60 | 1-10 | F to VW |
| 4.06 to 4.10 | 1-5 | N to W |
| 2.80 to 2.85 | 5-20 | VW |
| 2.73 | 15-35 | N |
| 2.60 | 5-10 | W |
| 2.43 | 35-40 | VW |
| 2.29 | 30-40 | N |
| 1.99 | 60-95 | N |
| 1.95 | 25-50 | F to N |
| 1.79 | 1-10 | N to VW |
| 1.53 | 5-10 | N to W |
| 1.51 | 5-10 | W to VW |
| 1.41 | 40-60 | N to W |
| 1.39 | 100 | N |
| 1.23 to 1.26 | 1-5 | VW |
| 1.14 | 5-10 | NtoW |
| 1.11 | 1-5 | W |
| 1.04 | 1-5 | VW |
| 1.00 | 5-10 | VW |
| 0.97 | 1-5 | W to VW. |

\* \* \* \* \*